United States Patent
Geisler

(10) Patent No.: US 10,788,014 B2
(45) Date of Patent: Sep. 29, 2020

(54) SYSTEMS AND METHODS FOR PROVIDING CONTROLLING POWER CAPACITY DURING THE OPERATION OF A REGENERATIVE POWER GENERATING UNIT

(71) Applicant: SENVION GmbH, Hamburg (DE)

(72) Inventor: Jens Geisler, Rendsburg (DE)

(73) Assignee: SENVION GmbH, Hamburg (DE)

( * ) Notice: Subject to any disclaimer, the term of this patent is extended or adjusted under 35 U.S.C. 154(b) by 27 days.

(21) Appl. No.: 16/049,316

(22) Filed: Jul. 30, 2018

(65) Prior Publication Data
US 2019/0032636 A1    Jan. 31, 2019

(30) Foreign Application Priority Data
Jul. 31, 2017  (DE) .......................... 10 2017 007 132

(51) Int. Cl.
*F03D 7/02* (2006.01)
*H02J 3/38* (2006.01)
(Continued)

(52) U.S. Cl.
CPC ........... *F03D 7/028* (2013.01); *F03D 7/0284* (2013.01); *F03D 9/257* (2017.02); *G05B 19/04* (2013.01);
(Continued)

(58) Field of Classification Search
CPC ........ F03D 7/028; F03D 7/0284; F03D 9/257; F05B 2260/84; F05B 2270/1033;
(Continued)

(56) References Cited

U.S. PATENT DOCUMENTS 9,243,613 B2 *  1/2016  Yin ........................ F03D 7/028
10,079,490 B2 *  9/2018  Guo .......................... H02J 3/12
(Continued)

FOREIGN PATENT DOCUMENTS

DE        102010014165       10/2011
DE     10 2012 215 565        3/2014
(Continued)

OTHER PUBLICATIONS

Search Report dated May 28, 2018, directed to German Application No. 10 2017 007 132.2; 10 pages.
(Continued)

*Primary Examiner* — Chun Cao
(74) *Attorney, Agent, or Firm* — Morrison & Foerster LLP

(57) ABSTRACT

A method for delivering controlling capacity to a regenerative power generating unit driven by a strongly fluctuating primary energy source includes routine determination of the actual uncertainty with which compliance with the target value for the controlling capacity $\Delta P_{RL}$ is achieved, in consideration of the fluctuating primary energy source, routine calculation of a dynamic security margin based upon the actual uncertainty, routine adjustment of the target value ($P_{target}$) on the basis of the requisite controlling capacity and the dynamic security margin. Statistical uncertainty is determined and the target value is then dynamically offset such that a corresponding buffer margin (security margin) is generated: large in the event of high uncertainty, low in the event of low uncertainty. Under consistent wind conditions, the security margin is significantly narrower, thus resulting in a larger target value.

23 Claims, 3 Drawing Sheets

(51) Int. Cl.
*F03D 9/25* (2016.01)
*G05B 19/04* (2006.01)
(52) U.S. Cl.
CPC ........... *H02J 3/386* (2013.01); *F05B 2260/84* (2013.01); *F05B 2270/1033* (2013.01); *F05B 2270/32* (2013.01); *F05B 2270/321* (2013.01); *F05B 2270/335* (2013.01); *G05B 2219/2619* (2013.01)
(58) Field of Classification Search
CPC ............ F05B 2270/32; F05B 2270/321; F05B 2270/335; G05B 19/04; G05B 2219/2619; H02J 3/386
See application file for complete search history.

(56) References Cited

U.S. PATENT DOCUMENTS

| | | | | |
|---|---|---|---|---|
| 10,151,301 | B2* | 12/2018 | Caponetti | ............... F03D 17/00 |
| 10,480,485 | B2* | 11/2019 | Hales | ...................... F03D 9/257 |
| 2012/0205913 | A1* | 8/2012 | Garcia Andujar | .... F03D 7/0276 290/44 |
| 2013/0026759 | A1 | 1/2013 | Krueger et al. | |
| 2013/0268131 | A1* | 10/2013 | Venayagamoorthy | .... G05F 5/00 700/286 |
| 2016/0173017 | A1 | 6/2016 | Beekmann | |
| 2017/0353036 | A1* | 12/2017 | Gil Lizarbe | ............ H02J 3/386 |
| 2018/0238303 | A1 | 8/2018 | De Boer et al. | |

FOREIGN PATENT DOCUMENTS

| | | |
|---|---|---|
| DE | 102013215396 | 2/2015 |
| DE | 102015114958 | 3/2017 |
| EP | 2 608 118 | 8/2017 |
| WO | 2014/000767 | 1/2014 |

OTHER PUBLICATIONS

Search Report dated Nov. 29, 2018, directed to EP Application No. 18186257.4; 12 pages.

* cited by examiner

SYSTEMS AND METHODS FOR PROVIDING CONTROLLING POWER CAPACITY DURING THE OPERATION OF A REGENERATIVE POWER GENERATING UNIT

CROSS-REFERENCE TO RELATED APPLICATIONS

This application claims the priority of German Application No. 10 2017 007 132.2, filed Jul. 31, 2017, the entire contents of which are incorporated herein by reference.

FIELD OF THE INVENTION

The invention relates to a method for the provision of controlling capacity during the operation of a regenerative power generating unit. The regenerative power generating unit is driven by a strongly fluctuating primary energy source. Specifically, this unit can be a wind turbine installation which, naturally, is driven by wind, the strength of which typically fluctuates. However, the invention can also relate, for example, to solar energy installations in which, under different conditions of cloud cover, a significant fluctuation in sunlight, as the primary energy source, can also occur.

BACKGROUND OF THE INVENTION

The progressively increasing installation of regenerative power generating units also raises the associated issue of their contribution to the stability of electricity networks. The key objective in the operation of electricity transmission and distribution networks is not only the transmission of electricity per se, but also the reliable and secure delivery thereof within predefined parameters. This issue, which is described overall as "network stability", is of exceptional significance. The maintenance of network stability requires, inter alia, the maintenance of a balanced ratio between the generation and consumption of electric power. In practice, the achievement of this balance constitutes a major challenge, as consumption in particular is subject to strong variations, and the installation of regenerative power plants is also associated with an increasing variation in generation. Controlling capacity is thus required, both a positive controlling capacity for the accommodation of peaks in consumption, and a negative controlling capacity for the accommodation of peaks in generation. The extensive installation of regenerative power generating units is such that the latter are now also required to deliver controlling capacity.

This applies specifically to the delivery of negative controlling capacity (i.e. the reduction of power output, or limitation), which can also be provided at any time by power generating units with a fluctuating primary energy source, such as e.g. wind turbine installations, independently of the respective conditions governing said primary energy source (e.g. the wind speed, in the case of wind turbine installations). Thus, for example, wind turbine installations, which are particularly extensively employed as regenerative power generating units, are required to deliver a negative controlling capacity which at least permits limitation to the requisite value, but wherein limitation can also be up to 10% greater ("over-fulfilment"). Limitation must usually proceed such the generators deliver a capacity which is smaller than the maximum possible capacity by a specific magnitude. The maximum possible output power, also described as the "available capacity", is the maximum power which can be extracted from the supply of the primary energy source, in consideration of currently prevailing conditions. The available capacity thus varies according to the supply of primary energy and, where applicable, according to further marginal conditions, which restrict potential extraction. Accordingly, the absolute magnitude of the capacity delivered under the action of limitation ("limited capacity") also varies in relation to the available capacity. Consequently, in the light of these natural variations, which are specifically associated with wind turbine installations, accurate limitation is scarcely achievable in practice. A degree of statistical security, for example 95% security, is therefore considered sufficient.

Determination of the available capacity poses a particular challenge given that, immediately a generating unit implements measures for the deliberate reduction of power extraction, it is now only possible to estimate the power which would otherwise have been available for extraction ("what would have happened if . . . "). For this estimation, methods are already known, which are generally based upon mathematical models for the behavior of the generator and the primary energy source. However, as in any estimation, this estimated available capacity is subject to a degree of uncertainty with respect to the deviation thereof from the true available capacity. The true available capacity will only be known upon the actual extraction thereof by the generator, once any deliberate reductions have been cancelled. If the absolute value of the reduction has been determined from an estimated available capacity and a desired relative reduction (controlling capacity), the magnitude of the mutual deviation between the estimated and the true available capacity, and thus the deviation between the actual controlling capacity delivered and that required, will not be disclosed until the time at which the reduction is cancelled.

A method and a control device for the delivery of controlling capacity by wind turbine installations are known from DE 10 2012 215 565 A1. The method is based upon wind forecasts. On the basis thereof, by means of statistical data, a wind pattern is predicted (over a period of hours or days), whereby short-term forecasts can also be established for the next 15-minute period. If a negative controlling capacity is called up, the notional value which is derived per se from the forecast is reduced by a constant capacity difference. By the setting of this constant capacity difference, the desired reduction in power output can be achieved, as an average value. However, this restriction to an "average value" signifies that, in the interim, values may be subject to an upward or downward deviation. The above-mentioned criterion, whereby controlling capacity is deployed for the purposes of limitation to the requisite value, can thus not be fulfilled with sufficient security.

This deficiency might be counteracted, simply by setting a larger capacity reduction as the average value. However, this would run counter to the intention of the operator of the power generating unit for the achievement of the greatest possible power output, and thus the achievement of the maximum possible yield.

SUMMARY OF THE INVENTION

An object of the invention is an improved method, and of a correspondingly improved control procedure for a regenerative power generating unit, whereby the above disadvantages can be eliminated, or at least reduced.

In a method for the delivery of controlling capacity during the operation of a regenerative power generating unit, specifically a wind turbine installation, which is driven by a strongly fluctuating primary energy source, for the generation of electric power which is to be delivered to a network, wherein at least a negative controlling capacity ($\Delta P_{RL}$) is available for call-up by the application of a target value for a reduced power output ($P_{target}$), which is smaller than the available capacity ($P_{avail}$), the following steps are provided according to embodiments of the invention: routine determination of an actual uncertainty with which a target value for controlling capacity ($\Delta P_{RL}$) can be achieved, in consideration of the fluctuating primary energy source, the routine calculation of a dynamic security margin based upon the actual uncertainty, and the routine adjustment of the target value on the basis of the requisite controlling capacity and the dynamic security margin.

In some embodiments, the adjustment of the target value only proceeds to the extent that the target value, inclusive of the security margin, complies with the controlling capacity. By "compliance with the controlling capacity", it is understood that the requirement with respect to the controlling capacity ($\Delta P_{RL}$) is fulfilled (or even over-fulfilled).

According to some embodiments, a core element is the concept whereby the security margin is calculated dynamically and progressively with reference to actual measured values (actual values). The method according to embodiments of the invention is thus independent of forecast values and their associated uncertainties. By means of progressive calculation, and its associated dynamic properties, the method according to embodiments of the invention can automatically adjust to widely-varying conditions in the primary energy source, without constituting unnecessary reserves in the event that stable and more consistent conditions prevail in the primary energy source, and thereby sacrificing yield. Thus, for example, for the primary energy source "wind", in the event of strongly-varying wind conditions, the target value for power output can be calculated such that a relatively broad security margin is generated, thereby ensuring compliance with the requisite controlling capacity (with the predefined confidence coefficient); conversely, in the event of consistent wind conditions, a significantly narrower security margin can be selected according to the invention, thereby resulting in a higher target value for power output. A higher yield is thus achieved, notwithstanding compliance with the requisite controlling capacity (with the predefined confidence coefficient). According to some embodiments, the invention thus identifies statistical uncertainty, and dynamically selects the target value, such that a corresponding buffer margin (expressed by the security margin) is provided: large in the event of high uncertainty, and small in the event of low uncertainty.

In principle, according to some embodiments, the invention constitutes a form of uncertainty tracker. Depending upon the wind conditions, this determines how great or small the security of compliance with a target value will be, and calculates the resulting width of a security margin. The tracker then displaces the target value to the extent that the security margin defined around the target value corresponds to the requisite controlling capacity. The combination of the dynamic determination of the security margin and a progressive following process thus achieves the fulfilment of apparently conflicting objectives, namely, secure compliance with the controlling capacity on the one hand, and the maintenance of a maximum yield on the other. This is unprecedented in the prior art.

Appropriately, the determination of actual uncertainty, by which the requisite controlling capacity ($\Delta P_{RL}$) can be adjusted, can proceed in consideration of a sliding margin between the actual capacity and the target capacity, preferably by the calculation of standard deviation. Thus, in a simple and elegant manner, a dynamic calculation can be executed by the application of current data, with no reference to forecasts. Moreover, a sliding calculation of this type, in its numerical aspects, is highly suitable for real-time execution on a computer, for example in the operating controller and the components thereof. Moreover, the calculation of uncertainty can be further optimized by the frequency-related weighting of the sliding margin, specifically by means of a low-pass filter. In this manner, only low-frequency and permanent deviations are considered. Accordingly, high-frequency disturbances, such as measurement noise, cannot result in any corruption.

In the interests of simplicity of representation, the remainder of this description is based upon the example of a wind turbine installation with the primary energy source "wind".

Preferably, in the determination of actual uncertainty, measuring errors are additionally considered in the determination of wind strength and/or wind direction. The measurement of wind direction is thus specifically subject to uncertainties, particularly where the wind direction sensors, as is customary, are arranged to the rear of the rotor blades, and are located in the wake of said rotor blades. This can easily result in corrupt readings. The same applies, correspondingly, to the measurement of wind strength, specifically where the main rotor of the wind turbine installation is employed for this purpose. Inaccuracies in calibrations and data sheets also have an exacerbating effect upon uncertainty.

From the actual uncertainty, the security margin is advantageously calculated by the application of a confidence coefficient. Values of 95% or 98% for the confidence coefficient are of proven validity.

In the determination of uncertainty, the additional consideration of modelling errors is of proven validity, for example in the determination of available capacity with reference to a power loss model, etc. This gives due consideration to the finding whereby customarily applied models, on the grounds of complexity, are not entirely accurate, but incorporate simplifications. Aspects can thus be considered or compensated, which are not customarily incorporated in models. Specifically, environmental topography, specifically landscape contours and/or adjoining power generating units, can be advantageously considered. This gives due consideration to the finding whereby, in the case of specific wind directions, where the wind turbine installation is operated in the wake of topographical undulations and/or adjoining wind turbine installations, corrupt readings can occur. Thus, superimposition effects associated with adjoining wind turbine installations can advantageously be considered, specifically with respect to shadow effects in the wake thereof. This applies specifically where the operating status of adjoining wind turbine installations is considered. It is particularly appropriate that any current throttling of wind turbine installations should be considered, specifically the throttling of an adjoining wind turbine installation. It has been shown that, in the absence of such consideration, significant errors can occur. The same applies, correspondingly, to the consideration of the statistical superimposition of a plurality of parameters, selected from a group comprising the strength of the primary energy source (specifically the wind speed), the available active capacity of the power generating unit and/or losses in a grouped arrangement of a plurality of power generating units.

Appropriately, an adaptation of model parameters, specifically by a target/actual comparison in unthrottled operation, is further provided. This permits the achievement of a fine adjustment and improvement of the model, thus permitting the reduction of uncertainty. If the model cannot be further improved, it is also possible, by the correlation of deviations between the model and measured values with specific environmental parameters, to determine the conditions under which the model will be impaired by more significant errors.

In the calculation of the dynamic security margin, a selectable factor is advantageously considered. It is thus possible to influence the width B of the security margin, depending upon the desired confidence level. Values of 2 for 95% security or 2.5 for 98% security are of proven validity.

It is hereby observed that the method according to embodiments of the invention can be applied to regenerative power generating units in both unthrottled and throttled operation. By throttled operation, it is understood that a capacity restriction applies to the regenerative power generating unit (for example, a wind turbine installation or a wind farm is only permitted to inject a maximum 80% of its rated capacity). This throttling value constitutes an absolute upper limit on power output, and thus additionally limits the available capacity. Any additional controlling capacity required, where applicable, must therefore show compliance with the throttling value. This means that, if the throttling value is lower than the available capacity, for the purposes of the present invention, the throttling value is to be applied as the available capacity ($P_{avail}$) Conversely, in an unthrottled installation, the controlling capacity is always to be understood with reference to the available capacity.

It is further observed that, alternatively, it can be provided that the width B of a security margin to be observed is not added to the negative controlling capacity called up, but is subtracted from the limited available capacity which, in the calculation of $P_{target}$, gives the same resulting value. In this case, the security margin might also be considered as a margin of error, and the available capacity thus corrected can be considered as the available capacity with a given (minimum) confidence level K.

A wind turbine installation is preferably employed as a regenerative power generating unit. This can be a single wind turbine, or a plurality of operatively combined wind turbine installations (also described as a wind farm).

The invention further encompasses a corresponding method for the operation of individual wind turbine installations or of a wind farm comprising a plurality of wind turbine installations. The invention further encompasses wind turbine installations which are equipped with a control system for the execution of the method, and a wind farm comprised of corresponding wind turbine installations.

BRIEF DESCRIPTION OF THE DRAWINGS

The invention is described in greater detail hereinafter with respect to the attached drawing and with reference to an exemplary embodiment. In the drawing.

DETAILED DESCRIPTION OF THE INVENTION

Figure 1:
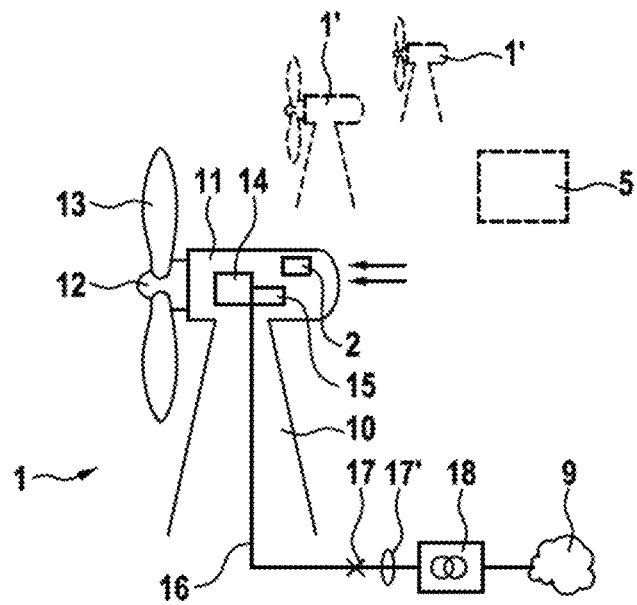
FIG. 1 shows a schematic view of a wind turbine installation according to one exemplary embodiment of the invention.
Figure 2:
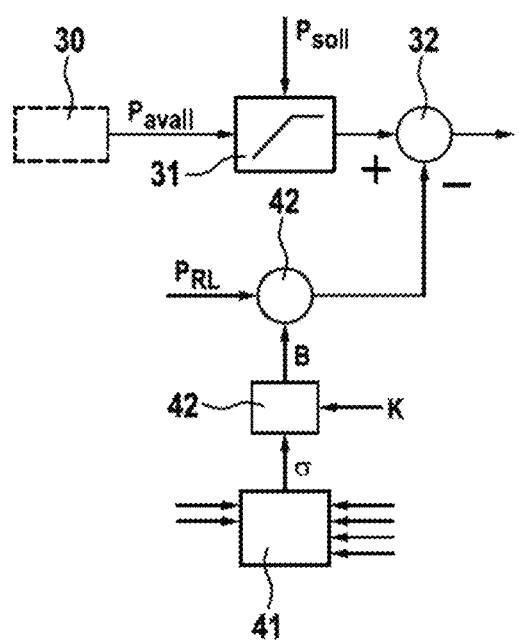
FIG. 2 shows a block circuit diagram of part of a power control circuit of the wind turbine installation, for the execution of the method.

A wind turbine installation 1 for the execution of the method according to the invention, according to one exemplary embodiment of the invention, is represented in FIG. 1, and an exemplary embodiment of a corresponding part of a power control circuit 3 of the wind turbine installation 1 (or of the wind farm) for the execution of the method is represented in FIG. 2.

The wind turbine installation 1, preferably in combination with further equivalent wind turbine installations 1', is arranged as an element of a wind farm, which is centrally controlled by a wind farm master control unit 5. The design of the wind turbine installation 1 and the power control circuit 3 for the execution of the method according to the invention is described in an exemplary manner hereinafter, with reference to the wind turbine installation 1.

The wind turbine installation, which is identified in its totality by the reference number 1, comprises a tower 10 with a nacelle 11, which is arranged to rotate in the azimuthal direction at the upper end of the tower 10. A wind rotor 12 having a plurality of rotor blades 13 is rotatably arranged on an end face of the nacelle 11. Via an (unrepresented) rotor shaft, the wind rotor 12 drives a generator 14, which is connected to a converter 15, for the generation of electrical energy. The electrical energy thus generated is delivered via a connecting line 16, which is routed through the tower 10, to a unit transformer 18 which is arranged at the base of the tower 10, and is fed from the latter, after conversion to a medium-voltage level, to a network 9 (this can be an internal wind farm network, or a transmission or distribution network). Voltage and current sensors 17, 17' are further arranged on the connecting line 16.

Operation of the wind turbine installation 1 is controlled by an operating controller 2, which is arranged in the nacelle 11. Measuring signals from the voltage and current sensors 17, 17' are delivered to the operating controller 2 (via unrepresented lines). Moreover, input signals are delivered to the operating controller 2 from a superordinate entity (for example, a network operator). These are embodied in FIG. 1 by two patterns of arrows, which represent a potential throttling of capacity to a maximum target value $P_{soll}$, and a call-up of (negative) controlling capacity $\Delta P_{RL}$.

Firstly, the known method for the delivery of negative controlling capacity from the prior art will be described. By negative controlling capacity, it is understood that, upon the call-up thereof, the wind turbine installation steps down its power output by a given magnitude. This permits the network operator to achieve the stabilization of the network in situations where there is an oversupply of capacity. The network operator expects a prompt and accurate fulfilment of the target; to this end, a tolerance margin is generally provided in that, in any event, the target should be fulfilled (minimum fulfilment), but can also be exceeded by a certain amount (for example, 10% over-fulfilment). It is important that the target should at least be fulfilled—this should be guaranteed.

Figure 4A:
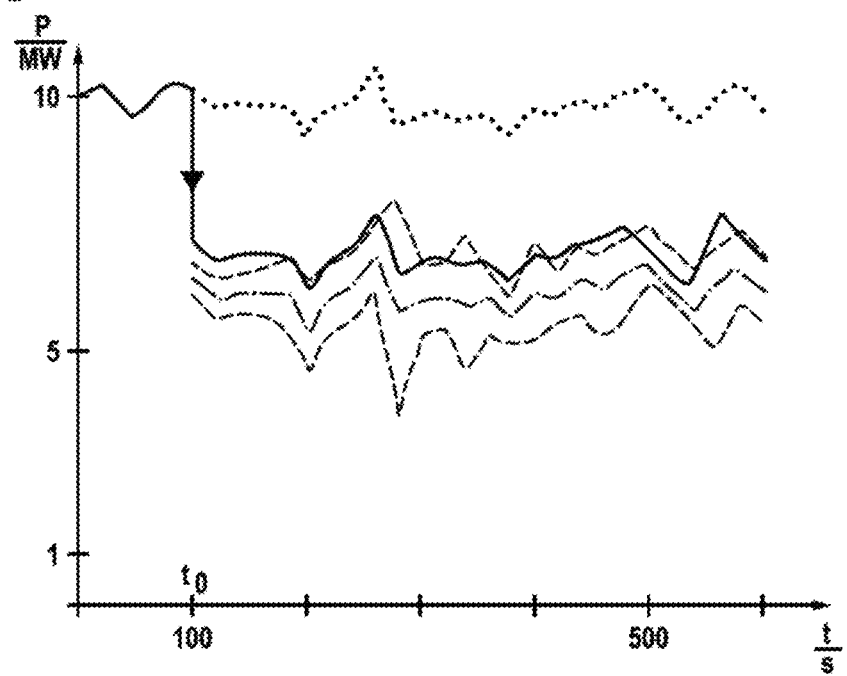
FIGS. 4A-B show time characteristics for capacity, in the event of the call-up of controlling capacity according to the prior art.
Figure 4B:
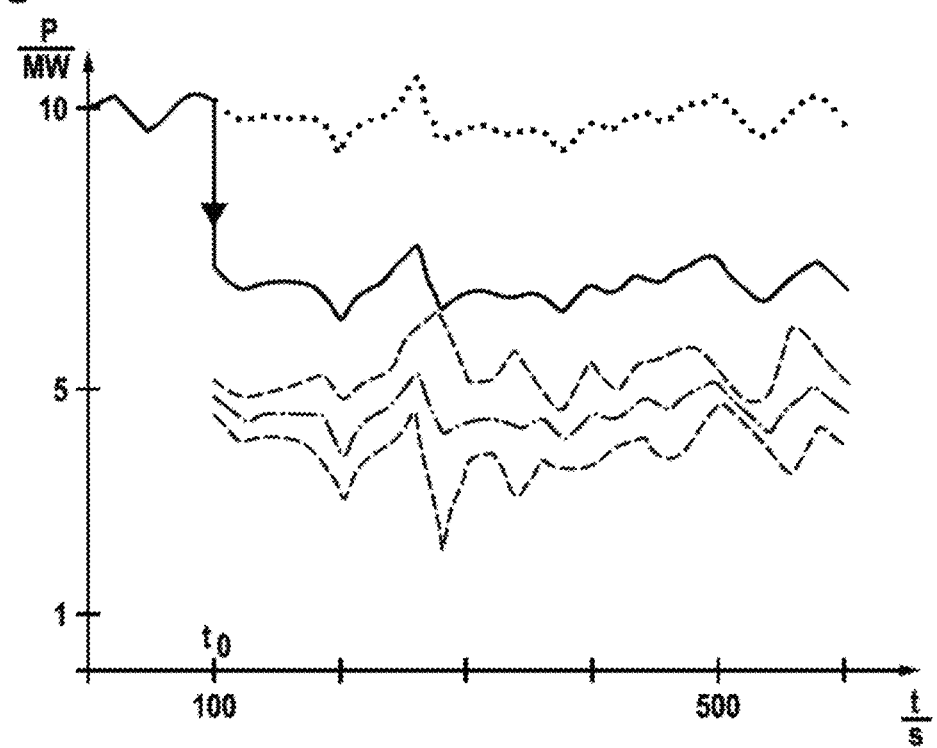

Here, in FIGS. 4A-B, it is assumed that the wind turbine installation (or wind farm), under prevailing wind conditions, can deliver a capacity of the order of 10 MW (see the uppermost line in FIGS. 4A-B). It is further assumed that, at time point $t_0$, a negative control capacity $\Delta P_{RL}$ of 3 MW is called up. This is represented in FIGS. 4A-B by the line jump in the continuous line at time point $t_0$. The potential power output thereafter under prevailing wind conditions (the actual available capacity) is represented by the dotted line. It will be seen that, with effect from time point $t_0$, the continuous line lies exactly 3 MW below the dotted line for the potential power output (the available capacity $P_{avail}$). However, this value cannot be employed directly as a target value for the power output of the wind turbine installation, as it is not known under conditions of limited operation.

However, as compliance with the requisite controlling capacity should be guaranteed to the network operator as a minimum value, but an over-fulfilment is possible, a lower value than the target value is employed on precautionary grounds. In the known variant represented in FIG. 4A, the target value is set such that the requisite controlling capacity of 3 MW is increased by approximately 24%, such that the ultimate margin to the potential power output $P_{avail}$ (see dotted line) is approximately 3.7 MW. The resulting target value is represented in FIG. 4A by the dash-dotted line. However, the setting of a target power output is only possible with fluctuations and, moreover, it has been shown in practice that the determination of wind speed, and thus the determination of the potential available capacity $P_{avail}$ per se can be subject to substantial inaccuracies. Consequently, there is an uncertainty margin in relation to the actual power injected and the genuine reserve capacity (controlling capacity). In FIG. 4A, demarcation of this uncertainty margin is shown by the broken lines, and is highlighted by a shade of gray. It will be seen that, at certain points in time, the uncertainty margin extends above the continuous line. This means that too much power is being injected, and the delivery of the promised negative controlling capacity cannot be observed. The target of the network operator is not fulfilled accordingly.

By way of a remedy, it can be provided that the modified target value is reduced still further. This is represented in FIG. 4B. Accordingly, the requisite controlling capacity of 3 MW is increased by approximately 75% (i.e. some three times the buffer margin, in comparison with the variant represented in FIG. 4A). It can clearly be seen in FIG. 4B that the target value thus modified (the dash-dotted line) is now significantly lower. It is thus achieved that the uncertainty margin (the gray-shaded region enclosed by the two broken lines) does not overshoot the continuous line at any time, but remains consistently below the latter or, at its maximum, touches the latter at a single point.

In the variant represented in FIG. 4B, the target of the network operator is thus securely achieved. However, this comes at a high price, namely, the setting of an exceptionally low target value (the dash-dotted line). In relation to the limiting value (continuous line), a substantial injection capacity is thus sacrificed, for which the operator of the wind turbine installation receives no remuneration.

These disadvantages are eliminated by the invention. Reference is now made to FIG. 2, which represents a power control circuit 3 as part of the operating controller 2 or master control unit 5. The method according to the invention is implemented therein. The power control circuit 3 incorporates a limiter 31. On the input thereof, a value is delivered for the available capacity $P_{avail}$, estimated by an estimation unit 30. The limiter 31 further incorporates an input for the maximum capacity $P_{soll}$ to be observed in throttled operation. The limiter 31 is designed to deliver the lower of these two capacities $P_{avail}$ and $P_{soll}$. The capacity value thus limited is applied on a positive input of a subtraction unit 32. The power control circuit 3 further incorporates an offset unit 4. This comprises a calculation module 41. A plurality of parameters are applied to the latter. These parameters include measuring uncertainties, specifically with respect to the determination of the wind speed $v_w$ and the wind angle $v_\alpha$, and with respect to modelling uncertainties in the determination/estimation of the available capacity $P_{avail}$, influences associated with topography or adjoining wind turbine installations, etc. From the latter, on the basis of current data, an actual uncertainty is calculated, and delivered as an output value $\sigma$. This is applied as an input signal on a multiplier 42. The latter applies an adjustable multiplication value K. By means of this modification K, the width B of a security margin is set with reference to the value $\sigma$. In the exemplary embodiment represented, a value of K=2.5 is selected for a confidence coefficient of the order of 98%. A measure is thus delivered for the width B of a security margin to be observed, which is delivered as an output signal from the multiplier 42 and applied to an input of a summation unit 43. On the other input of the summation unit 43, as an input value, a parameter for the negative controlling capacity $\Delta P_{RL}$ called up is applied. From the latter, by addition, the summation unit 43 calculates a value for a capacity offset $P_{offset}$, and delivers this on a negative input of the subtraction unit 32. The output value delivered by the limiter 31 is thus correspondingly reduced by the magnitude of the capacity offset $P_{offset}$. This results in a modified value, which can be delivered by the power control circuit 3 as a target value $P_{target}$. This is then employed by the operating controller 2 or the master control unit 5, in a manner which is known per se, for the setting of the power output of the wind turbine installation 1. Specifically, if the uncertainty determined by the calculation module 41 refers to the estimated available capacity, it is alternatively conceivable that the width B of a security margin to be observed is not added to the negative controlling capacity called up, but is subtracted from the limited available capacity which, in the end product of calculation ($P_{target}$), has the same effect. In this case, the security margin might also be considered as a margin of error, and the available capacity thus corrected considered as the available capacity with a (minimum) confidence value K.

Figure 3:
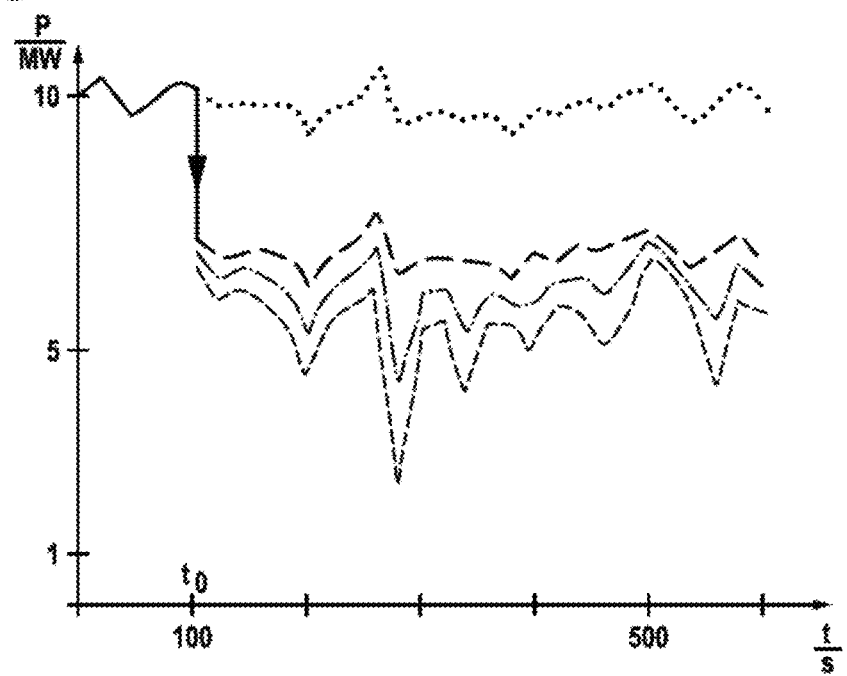
FIG. 3 shows a time characteristic for capacity, in the event of the call-up of controlling capacity according to the exemplary embodiment.

The action of the invention is represented in FIG. 3. As in FIGS. 4A-B, the initial unrestricted power output is represented by a continuous bold line. At time point $t_0$, a negative controlling capacity $\Delta P_{RL}$ of 3 MW is called up such that, with effect from this time point, the solid line abruptly drops by 3 MW (from this time point in FIG. 3, a bold dashed line is represented).

Conversely to the prior art according to FIGS. 4A-B, the target value (dash-dotted line) is not offset downwards to a lower capacity by a constant value, but the offset is constantly recalculated in a dynamic manner, and only proceeds to the extent that the limit of the uncertainty margin (dashed line) exactly matches the requirement with respect to controlling capacity (bold line). This planned coincidence of the two lines is represented in FIG. 3 by a bold dashed line. It will be seen that the uncertainty margin at no time exceeds the requisite controlling capacity (bold line), i.e. the requirement with respect to controlling capacity is fulfilled at all times.

This represents a significant improvement over the prior art according to FIG. 4A, where occasional overshoots can be observed. Moreover, according to the invention in FIG. 3, the target value (dash-dotted line) is significantly higher than in the prior art according to FIG. 4B; a higher yield is thus achieved at the same time. The invention thus provides advantages over the prior art, with respect to the quality of power delivery and with respect to the yield quantity.

The invention claimed is:

1. A method for delivering controlling power capacity during operation of a regenerative power generating unit, which is driven by a fluctuating-primary energy source, for generating electric power to be delivered to a network, wherein at least a negative controlling power capacity $\Delta P_{RL}$ is available for call-up via application of a target value for a reduced power output ($P_{target}$) that is smaller than an available power capacity ($P_{avail}$) of the regenerative power generating unit, the method comprising:

continuously determining an actual uncertainty with which the negative controlling power capacity $\Delta P_{RL}$ can be achieved by the regenerative power generating unit based on the fluctuating primary energy source;

continuously calculating a dynamic security margin based upon the actual uncertainty;

continuously adjusting the target value for the reduced power output ($P_{target}$) based on the negative controlling power capacity $\Delta P_{RL}$ and the dynamic security margin; and controlling power output of the regenerative power generating unit based on the target value for the reduced power output ($P_{target}$).

2. The method of claim 1, wherein the determination of the actual uncertainty is based on a sliding margin between the actual capacity and the target capacity.

3. The method of claim 2, comprising frequency-related weighting of the sliding margin.

4. The method of claim 1, wherein the dynamic security margin is calculated using a confidence coefficient.

5. The method of claim 1, comprising adjusting the target value ($P_{target}$) until the target value, inclusive of the security margin, complies with the controlling capacity ($\Delta P_{RL}$).

6. The method of claim 1, wherein the determination of the actual uncertainty is based on measurement errors in the determination of wind strength, wind direction, or both.

7. The method of claim 1, wherein the determination of actual uncertainty is based on modelling errors in the determination of the available capacity.

8. The method of claim 7, wherein the determination of actual uncertainty is based on environmental topography.

9. The method of claim 7, wherein the determination of actual uncertainty is based on a target/actual comparison in unthrottled operation.

10. The method of claim 6, wherein the determination of actual uncertainty comprises statistical superimposition of a plurality of parameters, wherein the parameters include at least one of the following: internal parameters of the regenerative power generating unit, environmental parameters, the available active capacity of the power generating unit, and losses in a grouped arrangement of a plurality of power generating units.

11. The method of claim 1, wherein determining the actual uncertainty accounts for superimposition effects with adjoining power generating units with respect to shadow effects.

12. The method of claim 11, wherein determining the actual uncertainty accounts for a current throttling of an adjoining power generating unit.

13. The method of claim 1, wherein the dynamic security margin is calculated based on a selectable factor that is selected in accordance with a confidence coefficient.

14. The method of claim 1, wherein the regenerative power generating unit is configured for throttled or unthrottled operation.

15. The method of claim 1, wherein the regenerative power generating unit is a wind turbine installation.

16. A regenerative power generating unit that is configured to be driven by a fluctuating primary energy source, comprising:

an output for delivering generated power;

a signal input for call-up of at least a negative controlling power capacity $\Delta P_{RL}$ via application of a target value for a reduced power output ($P_{target}$), which is smaller than an available power capacity ($P_{avail}$) of the regenerative power generating unit; and an operating controller that comprises a power control circuit, wherein the power control circuit is configured for:

continuously determining an actual uncertainty with which the negative controlling power capacity $\Delta P_{RL}$ can be achieved based on the fluctuating primary energy source, continuously calculating a dynamic security margin based upon the actual uncertainty, and continuously adjusting the target value for the reduced power output ($P_{target}$) based on the negative controlling power capacity $\Delta P_{RL}$ and the dynamic security margin, wherein the operating controller is configured to control power output of the regenerative power generating unit based on the target value for the reduced power output ($P_{target}$).

17. The method of claim 1, wherein the regenerative power generating unit is a plurality of operatively combined wind turbine installations.

18. The method of claim 2, wherein continuously determining the actual uncertainty comprises calculating a standard deviation.

19. The method of claim 3, comprising frequency-related weighting of the sliding margin using a low-pass filter.

20. The method of claim 4, wherein the confidence coefficient is 95% or 98%.

21. The method of claim 7, wherein the determination of actual uncertainty is based on a power loss model.

22. The method of claim 8, wherein the environmental topography comprises landscape contours or adjoining power generating units.

23. The regenerative power generating unit of claim 16, wherein the regenerative power generating unit is a wind turbine installation.

* * * * *